United States Patent [19]
Donnelly

[11] 3,737,725
[45] June 5, 1973

[54] CIRCUIT OVERVOLTAGE PROTECTOR

[75] Inventor: Thomas S. Donnelly, Wickliffe, Ohio

[73] Assignee: American Aviation Corporation, Cleveland, Ohio

[22] Filed: Nov. 8, 1971

[21] Appl. No.: 196,270

[52] U.S. Cl. .................................317/16, 317/31
[51] Int. Cl. ...............................................H02h 3/20
[58] Field of Search..................................317/16, 31

[56] References Cited

UNITED STATES PATENTS

| | | | |
|---|---|---|---|
| 3,527,985 | 9/1970 | Brown | 317/16 |
| 3,448,341 | 6/1969 | Casey | 317/16 X |

OTHER PUBLICATIONS

Motorola Silicon Zener Diode and Rectifier Handbook, 1961, p. 90.

Primary Examiner—James D. Trammell
Attorney—Robert J. Fay, Albert P. Sharpe, III, John H. Mulholland et al.

[57] ABSTRACT

The combination of a voltage sensitive device, for example, a zener diode, in circuit with a current sensitive device, for example, a circuit breaker or a fuse, arranged so that an overvoltage condition causes the voltage sensitive device to actuate the current sensitive device. In one embodiment, the zener diode is connected to a source of reference potential and the output terminal of a circuit breaker. When the voltage at the output terminal of the circuit breaker exceeds the breakdown voltage of the zener diode, the impedance effectively approaches zero and the current flow through the diode to ground causes the circuit breaker to interrupt the circuit between a voltage source and an output circuit. In a modification of this embodiment, a warning lamp is provided across the circuit breaker so that when the breaker has been actuated, the lamp is illuminated. In still another embodiment, a conventional cylindrical fuse in a series circuit with a voltage source and an output circuit is provided with a zener diode having its cathode connected to the output terminal of the fuse and its anode connected to the ground provided, for example, by a conductive member about the envelope of the fuse. When the voltage at the output terminal of the fuse exceeds a minimal level, the diode conducts to cause the fuse to open the circuit between the voltage source and the output circuit.

11 Claims, 5 Drawing Figures

PATENTED JUN 5 1973 3,737,725

INVENTOR
THOMAS S. DONNELLY

BY Fay, Sharpe & Mulholland
ATTORNEYS

CIRCUIT OVERVOLTAGE PROTECTOR

BACKGROUND OF THE INVENTION

This invention relates generally to an overvoltage protection circuit. More particularly, this invention relates to a voltage sensitive device in circuit with a current sensitive device and arranged so that when an overvoltage condition is sensed, the current sensitive device is actuated to interrupt the circuit. Still more particularly, this invention relates to a zener diode connected in circuit with the output terminal of a circuit breaker or fuse and to a source of reference potential so that when the voltage at the output terminal of the circuit breaker or fuse exceeds the breakdown voltage of the zener diode, the impedance of the diode effectively approaches zero causing a relatively high current flow to ground through the diode thus causing the actuation of the field circuit breaker or an interruption of the electrical continuity of the fuse.

In the prior art, a number of protective devices for use in electrical circuits have been developed. In general, these devices are of two types, i.e., current sensitive devices, such as fuses, circuit breakers and current sensitive relays, and voltage sensitive devices, such as relay coils, voltage sensitive switches and the like.

In general, in a circuit in which it is desired to have both overcurrent protection and overvoltage protection, both current sensitive and voltage sensitive protective devices are used. Aside from the multiplication of components, one of the difficulties in such an installation, however, is that the operation of the voltage sensitive device is not necessarily coordinated with the operation of the current sensitive devices. Thus, an overvoltage condition may not necessarily produce an overcurrent condition to interrupt the field circuit breaker. Thus, it is an aim of the art to develop an apparatus in which the voltage sensitive device causes the actuation of the current sensitive device. It is also an aim in the art to achieve such an operation with a minimum number of components and at a minimum expense.

In the particular situation of an aircraft, for example, it is an additional aim of the invention to provide a lightweight apparatus which achieves the aforementioned objects without increasing the number of parts necessary for the circuit or increasing the weight of the circuit. Thus, it is an aim of this invention to simplify the number of components involved to achieve both overcurrent and overvoltage protection in an electrical circuit.

BRIEF SUMMARY OF THE INVENTION

Directed to achieving the aims and objects set forth above, this invention relates to an improvement in a circuit of the type comprising a voltage source, an output circuit and current responsive means, in circuit with the voltage source and the output circuit, which are responsive to an overcurrent condition between the voltage source and the output circuit.

The improvement comprises voltage sensitive means in circuit with the current sensitive means and arranged so that when an overvoltage condition exists at the output of the current sensitive means, the voltage sensitive means causes an increase in current flow through the current sensitive means to interrupt the circuit between voltage supply and the output circuit. In a preferred embodiment, the current sensitive means is a circuit breaker and the voltage sensitive means is a zener diode having its cathode connected to the output terminal of the circuit breaker and its anode connected to a source of reference potential. When the voltage at the output terminal of the circuit breaker exceeds the breakdown voltage of the diode, the diode conducts, causing an increase in current flow through the circuit breaker to interrupt the circuit between the voltage supply and the output circuit. In an alternative embodiment, a warning lamp is provided between the input and output terminals of the circuit breaker so that when the circuit breaker conducts and opens, the warning lamp lights and remains lit.

In still another embodiment, the current sensitive means is a conventional fuse of the type comprising first and second conductive terminal members and a fuse link material connected between the first terminal member and the second terminal member. A zener diode has its cathode connected to the output terminal member and its anode connected to ground. The ground may be provided by a conductive member provided about the outer envelope of the fuse. Thus, a current sensitive fuse by this technique is also provided with voltage sensitive capabilities.

DETAILED DESCRIPTION OF THE PREFERRED EMBODIMENT

Figure 1:
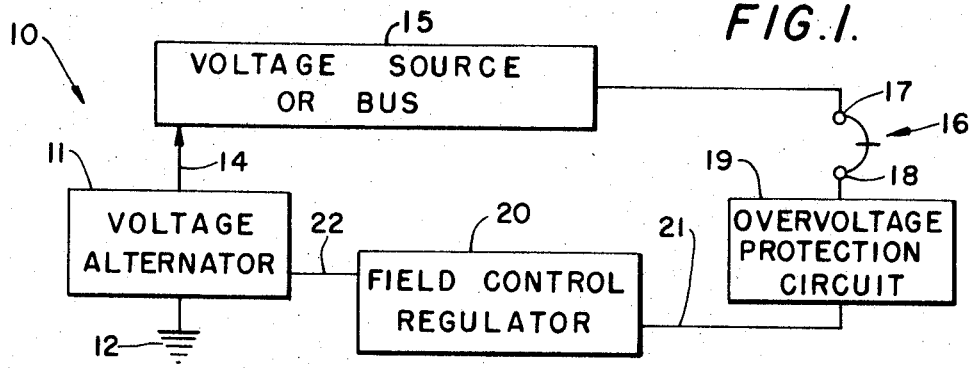
FIG. 1 is a circuit diagram in block form illustrating a typical prior art circuit having current sensitive and voltage sensitive protectors.

In FIG. 1, a typical prior art loop circuit which incorporates current sensitive and voltage sensitive protectors is shown generally by the reference numeral 10. The circuit 10 comprises a d-c voltage alternator 11 which is connected to a source of reference potential 12. Throughout this specification, the terms "source of reference potential" and "ground" are used interchangeably. The voltage alternator 11 produces a d-c voltage on a lead 14 connected to a voltage source or bus 15. A field circuit breaker 16 has its input terminal 17 in circuit with the voltage source or bus 15 and its output terminal 18 in circuit with an overvoltage protection circuit 19. The overvoltage protection circuit 19 is in circuit with a field control regulator 20 through lead 21 which in turn is in circuit through lead 22 with the voltage alternator 11.

Such a circuit incorporates a current sensitive protection by virtue of its use of the field circuit breaker 16 which opens or otherwise disables the series circuit in response to a current flow at a level greater than a predetermined level over nominal. The voltage sensitive device 19 is responsive to an increase in the voltage on the voltage source or bus 15 beyond a predetermined level above nominal. By way of example, the overvoltage device may be a coil for closing a relay to disable the series circuit or may be a silicon controlled rectifier which acts as a voltage sensitive switch, or any other type of voltage sensitive device. The signal from the overvoltage protective device 19 may be used to feedback a negative control voltage or otherwise activate the field control regulator circuit 20 to provide a signal to the voltage alternator 11 to reduce the output on the voltage source or bus 15. In such an installation, it can be seen that the voltage sensitive device 19 operates independently from the current sensitive device 16.

Figure 2:
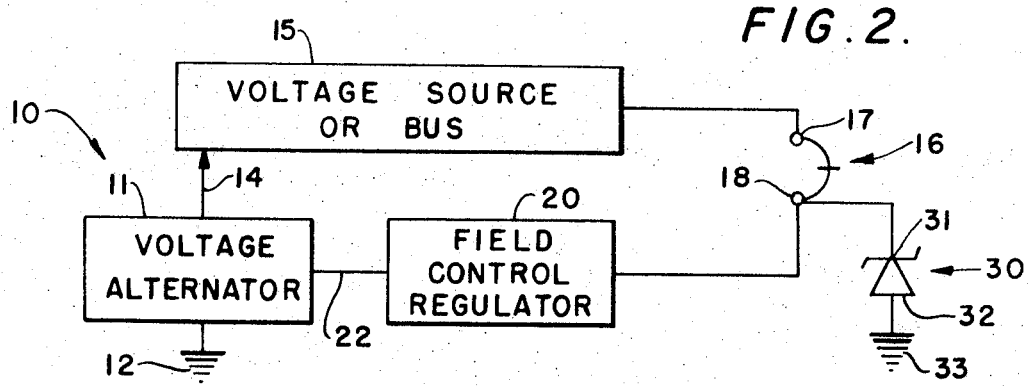
FIG. 2 is a circuit diagram partially in block form, similar to FIG. 1, showing the improved voltage sensitive protection circuit according to the invention.

FIG. 2 illustrates the circuit of FIG. 1 modified in accordance with the invention. Where applicable, like reference numerals have been used in FIG. 2 to identify components which correspond to those previously identified in FIG. 1. Instead of the overvoltage protection circuit 19, an avalanche or zener diode, identified generally by the reference numeral 30, has its cathode 31 in circuit with the output terminal 18 of the field circuit breaker 16 and its anode 32 connected to a source of reference potential 33.

The zener diode 30 is selected so that its reverse standoff voltage is greater by a predetermined level than the nominal voltage on the source or bus 15. For an aircraft installation, it has been found feasible to select a reverse standoff voltage of the zener diode at about 2 volts over the desired nominal, although in some installations it may be desirable to implement a diode having a reverse standoff voltage which is only slightly greater than nominal, for example, on the order of 0.2 volts. In any event, the breakdown voltage of the zener diode is selected as that required to protect the system.

When the voltage on the source or bus 15 is less than the breakdown voltage of the zener diode, the series circuit remains closed and continues to operate in a closed loop condition. When the voltage of the source or bus 15 exceeds the breakdown voltage of the zener diode 30, the diode 30 begins to conduct rapidly, thus approaching an effective short circuit current condition because of the voltage-current characteristics of a zener diode, and a zero impedance condition, thus permitting a current to flow through the diode which is in excess of the nominal capability of the field circuit breaker 16. This overvoltage condition thus causes the field circuit breaker 16 to open to disable the series circuit 10. Thus, by the use of the diode in the manner of the invention, an overvoltage condition is sensed which is transformed into a current sensitive condition to cause the field circuit breaker to be actuated.

It is an advantage of such a system that the diode 30 will fail in a shorted mode when an overvoltage condition exists so that it would be impossible to re-energize the system until the cause for the overvoltage condition has been determined.

Figure 3:
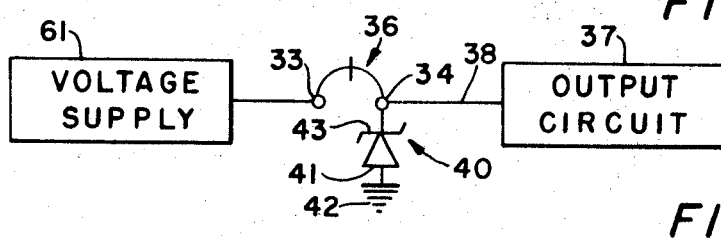
FIG. 3 is a generalized drawing of the basic design of the circuit according to the invention.

FIG. 3 illustrates the generalized form of the circuit according to the invention which incorporates a voltage source 61 in circuit with the input terminal 33 of a field circuit breaker 36 which in turn has its output terminal 34 in circuit with an output circuit 37 by a lead 38. The anode 41 of the zener diode 40 is connected to a source of reference potential 42 while the cathode 43 of the zener diode 40 is connected to the output terminal 34 of the circuit breaker 36 which is remotely located on the output side of the breaker 36 from the voltage source 61.

Under normal operating conditions, if the voltage provided on the lead 38 or at the output terminal 34 of the circuit breaker 36 remains less than the breakdown voltage of the zener diode 40, and the current flow through the circuit breaker 36 is less than nominal, the circuit will operate according to its conventional plan. However, when the voltage at the output terminal of the circuit breaker 36 or on the lead 38 exceeds the standoff voltage of the zener diode 40, the diode 40 will break down and conduct to ground 42 increasing the current flow through the circuit breaker 36 to interrupt the circuit. Thus, in this manner, the zener diode 40 acts as a voltage sensitive device to actuate the current sensitive device 36.

Figure 4:
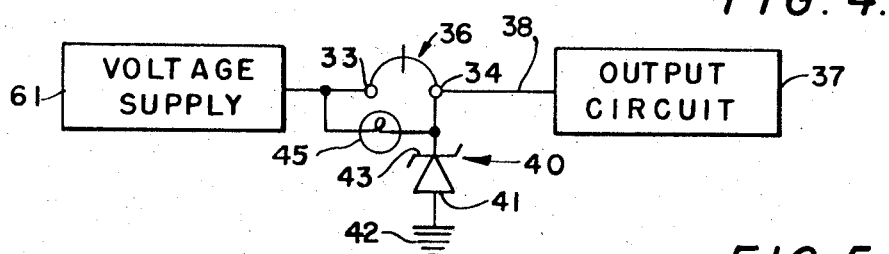
FIG. 4 is a view similar to FIG. 3 further incorporating a warning lamp across the circuit breakers.

FIG. 4 is an alternative embodiment similar to FIG. 3 which further includes a warning lamp 45 in circuit between the input terminal 33 and the output terminal 34 of the circuit breaker 36. Under the overvoltage conditions described in connection with FIG. 3, after the circuit breaker 36 has been interrupted, the voltage across the lamp 45 is effectively the difference between the voltage supply 61 and the voltage at the source of reference potential 42 causing the lamp to illuminate to indicate that an overvoltage condition exists and that the circuit breaker has been tripped.

Figure 5:
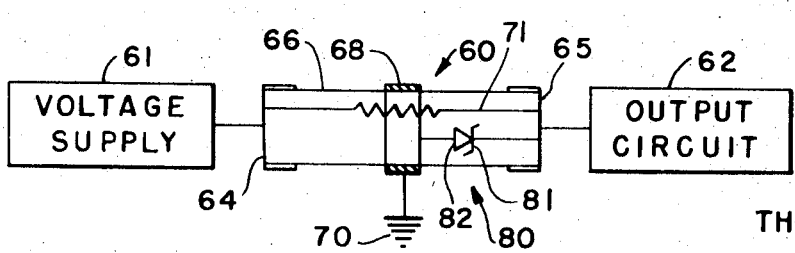
FIG. 5 is a circuit diagram showing a typical cylindrical fuse modified according to the teachings of this invention to provide a voltage sensitivity to the current sensitive fuse.

FIG. 5 is an example of a physical embodiment of the teachings of the invention in a conventional cylindrical fuse, designated generally by the reference numeral 60 in series circuit with a voltage source 61 and an output circuit 62. The fuse 60 comprises a pair of conductive terminal members 64 and 65 secured to a nonconductive envelope 66, for example, a cylindrical glass envelope. A conductive member 68 is provided about the envelope of the cylindrical fuse 60 and is connected to a source of reference potential 70. The terminal members 64 and 65 are in a conductive relationship with a fuse link 71 disposed in the interior of the cylindrical envelope 66 which, in accordance with the teachings of conventional current sensitive devices, will melt and thus open the series circuit between the source 61 and the circuit 62 when the current flow through the fuse exceeds its rated value.

In order to modify the conventional fuse thus described, to provide a voltage sensitive capability in addition to a current sensitive capability, a zener diode 80 is connected, preferably within the envelope 66 of the fuse 60, having its cathode 81 in circuit with the terminal member 65 and its anode 82 in circuit with the conductive member 68 and thus, in circuit with ground 70. Thereafter, if the voltage at the output of the fuse at terminal 65 exceeds nominal, the zener diode 80 will break down in the manner previously described and cause the fuse link 71 in the fuse 60 to open.

Thus, an improvement has been described which provides a voltage sensitive capability to a current sensitive device.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An electrical circuit for removing a circuit from a source of electrical potential at a predetermined overvoltage condition, comprising:
   a source of electrical potential,
   an output circuit for receiving said electrical potential,
   current sensitive means in circuit with said source and said output circuit and arranged so that the electrical potential supplied to said output circuit is interrupted when the current flow to said output circuit exceeds a predetermined level, and
   voltage sensitive means in circuit with said current sensitive means and said output circuit and arranged so that when the potential supplied to the output circuit exceeds a predetermined level, the voltage sensitive means breaks down to cause said current sensitive means to operate to interrupt the current flow to the output circuit and to remove said output circuit from said source, said voltage sensitive means being selected to become conductive and conductively fail when said potential exceeds said predetermined level, whereupon said voltage sensitive means will fail in a shorted mode.

2. The circuit as set forth in claim 1 wherein said voltage sensitive means is a zener diode.

3. The circuit as set forth in claim 2 wherein said current sensitive means is a circuit breaker comprising an input terminal in circuit with said source, an output terminal in circuit with said output circuit and means for interrupting an electrical connection between said input and said output terminal when the current flow between said input and output terminal exceeds a predetermined level, and wherein said zener diode comprises a cathode in circuit with the output terminal of said circuit breaker, and an anode in circuit with a source of reference potential.

4. The circuit as set forth in claim 3 further including indicating means connected between said input terminal and said output terminal of said circuit breaker for providing a physical representation that an overvoltage condition has been sensed.

5. The circuit as set forth in claim 4 wherein said indicating means is an indicator lamp.

6. The combination of:
   a current sensitive device, including an input terminal and an output terminal, which is responsive to current flow through said device to achieve a first predetermined condition different from a nominal condition when said current flow exceeds a predetermined level, and
   a voltage sensitive device in circuit with the output terminal of the current sensitive device and a source of reference potential arranged so that when the voltage at the output terminal of the current sensitive device exceeds a predetermined level, the voltage sensitive device breaks down to cause the current sensitive device to achieve the first predetermined condition, said voltage sensitive means being selected to fail conductively when said voltage exceeds said predetermined level by a predetermined amount, whereupon said voltage sensitive means fails in a shorted mode.

7. The combination as set forth in claim 6 wherein said voltage sensitive device is a zener diode.

8. A first voltage and current sensitive device comprising:
   a first terminal,
   a second terminal,
   a current sensitive member connected between said first terminal and said second terminal, and
   voltage sensitive means in circuit with either of said first terminal or said second terminal and a source of reference potential and arranged so that when the voltage sensed by said voltage sensitive means exceeds a predetermined level by a predetermined amount, the connection between said current sensitive member and said first terminal and said second terminal is interrupted, said voltage sensitive means being selected to fail conductively when said voltage exceeds said predetermined level by said predetermined amount, whereupon said voltage sensitive means fails in a shorted mode.

9. The device as set forth in claim 8 wherein said voltage sensitive means is a zener diode.

10. The device as set forth in claim 9 further including a non-conductive envelope connecting said first terminal and said second terminal, and
    a conductive member supported by said envelope and in circuit with said source of reference potential, said zener diode being connected between said conductive member and either said first terminal or said second terminal.

11. The device as set forth in claim 10 wherein said zener diode is contained within said envelope.

* * * * *